US009906960B2

(12) United States Patent
Jenkins et al.

(10) Patent No.: US 9,906,960 B2
(45) Date of Patent: Feb. 27, 2018

(54) TOUCH MOVEMENT ACTIVATION FOR GAINING ACCESS BEYOND A RESTRICTED ACCESS GATEWAY

(71) Applicant: INTERNATIONAL BUSINESS MACHINES CORPORATION, Armonk, NY (US)

(72) Inventors: Keith A. Jenkins, Sleepy Hollow, NY (US); Barry P. Linder, Hastings-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/145,017

(22) Filed: May 3, 2016

(65) Prior Publication Data
US 2017/0325093 A1    Nov. 9, 2017

(51) Int. Cl.
*H04W 12/08* (2009.01)
*H04L 29/06* (2006.01)

(52) U.S. Cl.
CPC ............ *H04W 12/08* (2013.01); *H04L 63/06* (2013.01); *H04L 63/10* (2013.01)

(58) Field of Classification Search
CPC ...... G06F 3/0488; G06F 21/83; G06F 3/0219; G06F 3/0233; G06F 19/322; H04L 2209/80; H04L 9/3226; H04L 9/3236; H04L 51/12; H04W 12/04; H04W 12/08; H04N 2005/443
See application file for complete search history.

(56) References Cited

U.S. PATENT DOCUMENTS

| | | | | |
|---|---|---|---|---|
| 5,084,832 A | * | 1/1992 | Yamada | G01G 13/16 177/25.18 |
| 8,046,721 B2 | * | 10/2011 | Chaudhri | G06F 3/04883 345/173 |
| 8,941,466 B2 | * | 1/2015 | Bayram | G06F 21/316 340/5.52 |
| 8,949,974 B2 | * | 2/2015 | Narendra | H04M 1/673 380/241 |
| 9,310,929 B2 | * | 4/2016 | Cudak | G06F 3/0416 |
| 9,432,366 B2 | * | 8/2016 | Apostolos | H04L 63/0861 |

(Continued)

OTHER PUBLICATIONS

Anonymous, "A method for unlocking touch-screen devices protected by alphanumeric password" IP.com No. 000233260, Dec. 4, 2013, pp. 1-4.

(Continued)

*Primary Examiner* — Nizar Sivji
(74) *Attorney, Agent, or Firm* — Tutunjian & Bitetto, P.C.; Vazken Alexanian

(57) ABSTRACT

A method for gaining access beyond a restricted access gateway includes an access key sequence stored on memory of a device. The access key sequence includes a sequence of key entries and key touch movements. An entered request sequence including keys activated by touch on a keyboard of the device and directions of touch movements made on the keyboard is recorded. With an access controller, it is determined whether the recorded entered request sequence matches the access key sequence. Access beyond the restricted access gateway is granted to functions when the recorded entered request sequence matches the access key sequence.

18 Claims, 8 Drawing Sheets

(56) References Cited

U.S. PATENT DOCUMENTS

2013/0031619 A1\* 1/2013 Waltermann .......... G06F 21/305
　　　　　　　　　　　　　　　　　　　　　　　　726/8
2013/0160088 A1　 6/2013 McFarland
2014/0215632 A1\* 7/2014 Adderly ................. G06F 21/31
　　　　　　　　　　　　　　　　　　　　　　　　726/26
2015/0007308 A1　 1/2015 Mankowski
2015/0254444 A1　 9/2015 Herger et al.
2015/0286814 A1\* 10/2015 Gajewski ................ G06F 21/36
　　　　　　　　　　　　　　　　　　　　　　　　726/19

OTHER PUBLICATIONS

Anonymous, "Method to Improve Pattern Based Password Entry" IP.com No. 000228888, Jul. 10, 2013, pp. 1-3.
Anonymous, "Two-factor Access Code Based on Characters and Pressure" IP.com No. 000210046, Aug. 23, 2011, pp. 1-3.

\* cited by examiner

TOUCH MOVEMENT ACTIVATION FOR GAINING ACCESS BEYOND A RESTRICTED ACCESS GATEWAY

BACKGROUND

Technical Field

The present invention relates to gaining access beyond restricted access gateways, such as password-protected restricted access devices, and more particularly to systems and methods for obtaining access by activating keys and making one or more directional touch movements on keys of a keyboard device associated with a restricted access gateway.

Description of the Related Art

Access restricted gateways such as restricted access devices, e.g., cell phones, tablets, laptops, and computers, may use a password entered on a keyboard to gain authorized access to the device. In another sense, the restricted access gateway may limit access to something other than a device per se, such as a website, an application, or a place where financial transactions are conducted. The password may be numbers, characters, letters, and combinations thereof. Password protection prevents unauthorized persons from gaining access beyond the gateway, thereby denying access to private data stored there, while not limiting the authorized user from obtaining access to the range of device capabilities and the stored information it contains (it should be understood that a restricted access device may be used without gaining access in certain limited instances, and one such instance of use is the making of an emergency phone call). By gaining authorized access, a person can use the stored applications, processes and resources in the device.

A restricted access gateway, such as a password-protected cell phone, may be regarded as an extension of the user, since the user may store his or her personal information in the device. Such information may include credit card and other financial information, social security numbers, other account information, such as Internet retailer account information, personal contacts, photographs, personal documents, email, text messages, health and exercise information, music, games and other forms of entertainment. The value of such information is readily apparent and should be protected e.g., by denying access to those who are not authorized to have this information.

SUMMARY

According to an embodiment of the present principles, described is a method for gaining access beyond a restricted access gateway. In the method, an access key sequence is stored on memory of a device. The access key sequence includes a sequence of key entries and key touch movements. An entered request sequence including keys activated by touch on a keyboard of the device and directions of touch movements made on the keyboard is recorded. With an access controller, it is determined whether the recorded entered request sequence matches the access key sequence. Access beyond the restricted access gateway is granted to functions when the recorded entered request sequence matches the access key sequence.

According to a further embodiment of the present principles, described is a system for gaining access beyond a restricted access gateway to functions of a device. The system has a keyboard and an access key module that includes a key entry sequence and key touch movement sequence. A keyboard processing module records a sequence of touch-activated keys on the keyboard of the device. A touch direction detector senses the directions of touch movements on the keys during touch-activation. An access controller compares the recorded sequence of touch-activated keys and the directions of touch movements on the keys during touch-activation with the key entry sequence and key touch movement sequence of the access key module. Access beyond the gateway to functions of the device is granted when the recorded sequence of touch-activated keys and the directions of touch movements on the keys during touch-activation match the key entry sequence and the key touch movement sequence of the access key module.

According to yet a further embodiment according to the present principles, described is a computer program product for gaining access beyond a restricted access gateway, the computer program product comprising a non-transitory computer readable storage medium having program instructions embodied therewith, the program instructions being executable by a computer to cause the computer to perform a method in which an access key sequence is stored on memory of a device. The access key sequence includes a sequence of key entries and key touch movements. An entered request sequence including keys activated by touch on a keyboard of the device and directions of touch movements made on the keyboard is recorded. With an access controller, it is determined whether the recorded entered request sequence matches the access key sequence. Access beyond the restricted access gateway is granted to functions when the recorded entered request sequence matches the access key sequence.

These and other features and advantages will become apparent from the following detailed description of illustrative embodiments thereof, which is to be read in connection with the accompanying drawings.

BRIEF DESCRIPTION OF THE SEVERAL VIEWS OF THE DRAWINGS

The disclosure will provide details in the following description of preferred embodiments with reference to the following figures wherein.

DETAILED DESCRIPTION

Figure 1:
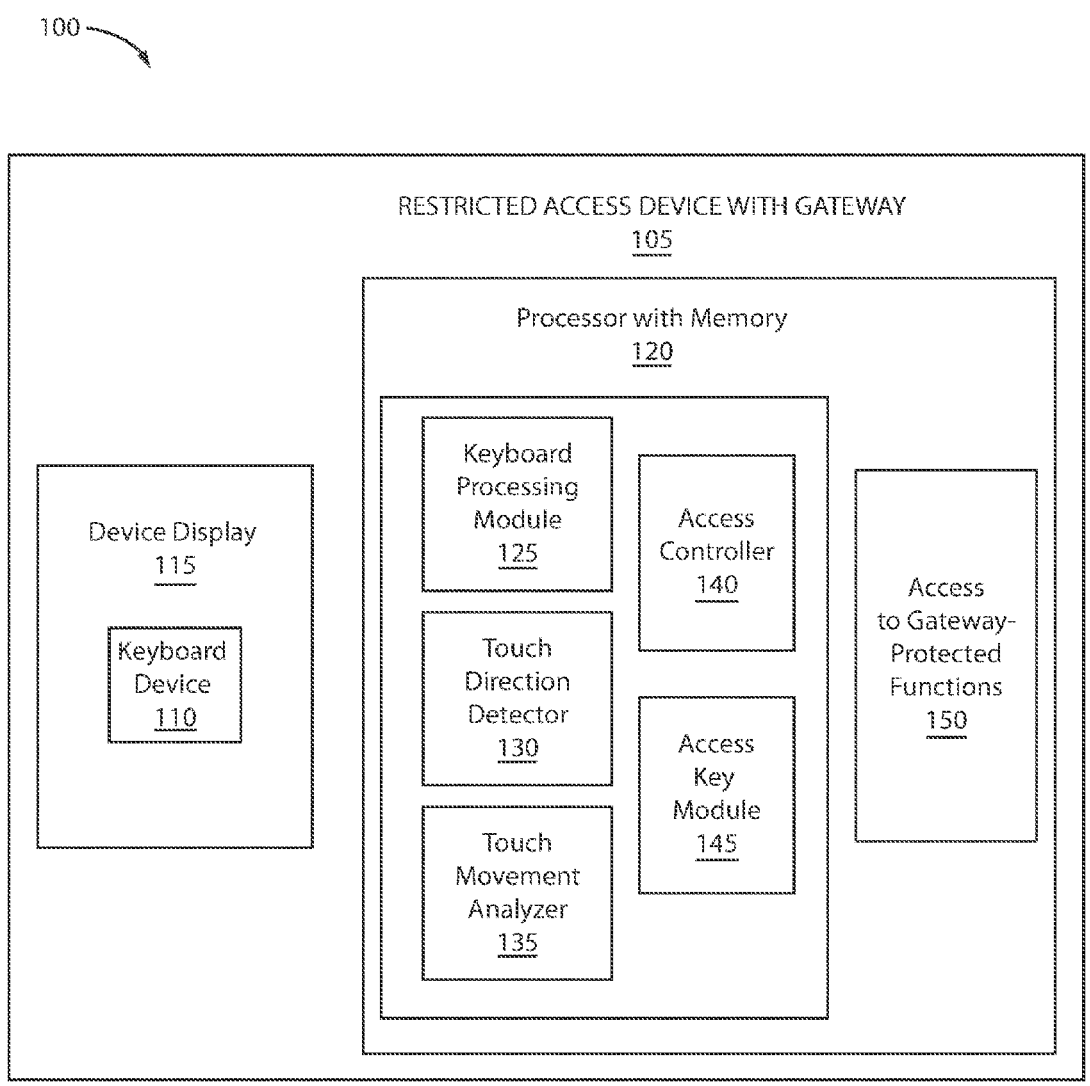
FIG. 1 depicts a system in accordance with an embodiment of the present principles for gaining access beyond a restricted access gateway, as exemplified by a restricted access device in which protected functions lie beyond the gateway of the device.

Methods and systems are provided for gaining access beyond a restricted access gateway, which by way of example may be a device such as a mobile phone or other device such as a tablet computer. In one embodiment, the restricted access gateway may limit access to something other than a device per se, such as a website, an application, or a place where financial transactions occur. Hereinafter, for purposes of describing embodiments according to the present principles, the discussion shall pertain to accessing restricted access devices. In one embodiment, the user makes one or more touch movements on the keys of the keyboard device that extend in a selected direction that originate or terminate on a key in a sequence that unlocks the device. For example, the user may swipe towards or away from keys in a selected sequence that unlocks the device. In yet another embodiment, the touch activation of keys of a keyboard device and touch movements on the keyboard device that extend in a selected direction towards or away from a key provide a sequence that unlocks the device. For example, as a key of the sequence is pressed, it may be accompanied by a touch movement on the keyboard device that begins on the key. The touch movement may be a directional swipe. Key activation and touch movement may be effected by a finger, or it may be affected by an object such as a stylus.

In accordance with the present principles, it would not be sufficient to enter only the correct numeric or alphanumeric combination to unlock the device; the correct combination needs to be accompanied by the correct directional movements, which are part of the device-unlocking combination. This increases the security of the device, while not increasing the number of input characters that may have to be used in a password combination.

Combining across-key directional movement with key pressing, of real or virtual keys, may provide a more secure device unlocking combination for a given number of key selections. Simultaneous directional movements during password entry may also thwart "shoulder surfing", in which password entry is observed over the shoulder of a user in order to steal the password.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed. As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The description of the present disclosure has been presented for purposes of illustration and description, but is not intended to be exhaustive or limited in the form disclosed. Many modifications and variations will be apparent to those of ordinary skill in the art without departing from the scope of the description. The embodiment was chosen and described in order to best explain the principles of the description and the practical application, and to enable others of ordinary skill in the art to understand the description for various embodiments with various modifications as are suited to the particular use contemplated.

The terminology used herein is for the purpose of describing particular embodiments only and is not intended to be limiting of the description. As used herein, the singular forms "a", "an" and "the" are intended to include the plural forms as well, unless the context clearly indicates otherwise.

The terms "comprises" and/or "comprising," specify the presence of stated features, steps, operations, elements, and/or components, but do not preclude the presence or addition of one or more other features, integers, steps, operations, elements, components, and/or groups thereof.

Referring to FIG. 1, depicted is a system 100 embodied in a restricted access gateway device 105 in accordance with the present principles, in which functions 150 are protected from access by the gateway of the device 105. By way of example, the restricted access device 105 is a cell phone. The restricted access device 105 includes a keyboard device 110, which is presented on a device display 115. The keyboard device 110 may be a touch pad that is activated by touch, such as by the finger of a user. The keyboard device 110 displays numbers, letters, symbols and/or combinations thereof.

Device 105 is further provided with a processor 120 having memory in which a sequence of actions performed by a device user are processed to determine whether access to functions beyond the gateway should be granted or denied. For example, a keyboard processing module 125 processes the keys activated by touch and records the activated keys and the sequence in which they are activated.

Touch direction detector 130 detects the directional movement of a finger or other object in contact, e.g., touching, the keyboard device, such as a swiping movement towards a key or away from a key. Signals from the touch direction detector 130 are processed by the touch movement analyzer 135, which determines the direction of movement on the keyboard device 110 made by a finger or other object.

Access controller 140 receives the determined directions of movements from the touch movement analyzer 135 and the record of activated keys from keyboard processing module 125. Access controller 140 compares the entered combination of activated keys and touch movements with an access key sequence of key entries and key touch movements stored in access key module 145.

The access key sequence stored in the access key module 145 was created at an earlier time, such as the time when the device was configured for use. For example, after purchase, a new device will lead the user through a configuration routine including a prompt to enter an access key sequence that is a key entry sequence and key touch movement sequence. When the user has selected the access key sequence, it is recorded and stored in the key access module 145.

When access controller 140 determines that the entered combination of activated keys and touch movements matches the access key sequence of key entries and key touch movements stored in access key module 145, then the access controller 140 provides access through the gateway, and allows the user to access protected functions 150 stored on the device 105. The user may then interact with the device 105 through display 115 to access functions, e.g., applications, that are on the device and which are protected by the gateway through which the user has gained access. When the access controller 140 determines that the entered combination of activated keys and key touch movements does not match the access key sequence stored in access key module 145, then access controller 140 denies access to functions beyond the gateway.

It should be appreciated that some functions and applications 150 may be available to the user without gaining full access. Such functions and applications include the ability to power a device on or off, to restart a device, use a camera, and/or make an emergency phone call. Examples of restricted access functions, e.g., those that lie beyond the gateway and are protected thereby, include non-emergency phone usage, email, text messaging, Internet, contact lists, calendar applications, timer applications, health-related applications, diet-related applications, exercise-related applications, financial-related applications, pay-with-device applications, shopping applications, word processing applications music libraries, television applications, video applications, games, to name a few. Any categorization of protected and unprotected functions, e.g., applications and processes, are considered to be within the scope of this description.

In another embodiment of the system in accordance with the present principles, the touch direction detector 130 senses movements made while touching the keyboard device that are towards a key or away from a key, and the touch movement analyzer 135 determines the direction of movements while touching the keyboard device.

In another embodiment of the system in accordance with the present principles, the touch direction detector 130 senses a tactile action made while touching the keyboard device, and the touch movement analyzer 135 determines the kind of tactile action made while touching the keyboard device. Such tactile action may be a sustained touching of a key during activation, it may be a tap of the keyboard device following a directional movement, and it may be a tap on the keyboard device at a location off the key, unaccompanied by any touch movement. The sustained touching of a key during activation may have a duration of, for example, a quarter second, a half second, three quarters of a second, a second, or longer than a second. The tactile action is stored in the access key module 145 as part of the access key sequence, recorded as part of the access key sequence when the user is prompted to create one.

In another embodiment of the system in accordance with the present principles, the access controller 140 receives the determination of a tactile action made while touching the keyboard device, compares the entered combination of tactile action, key entries and key touch movements with an access key sequence of key entries, tactile actions and key touch movements stored in access key module 145, and permits access beyond the gateway to protected functions 150 when there is a match. When there is no match, e.g., when one or more of the entered combination and sequence and stored access key sequence do not match, the access controller does not permit access through the gateway. The access key sequence of key entries, tactile actions, and key touch movements may be recorded and stored in the key access module 140 in the manner described above, such as for example, upon a prompt that takes place during device configuration, as described above.

It should be further appreciated that any portion or combination of the processes, controls and modules of FIG. 1 can be implemented in a non-transitory computer programming product comprising a storage medium readable by a processing circuit and storing instructions for execution by the processing circuit of an application server for performing a methods described here.

Figure 2:
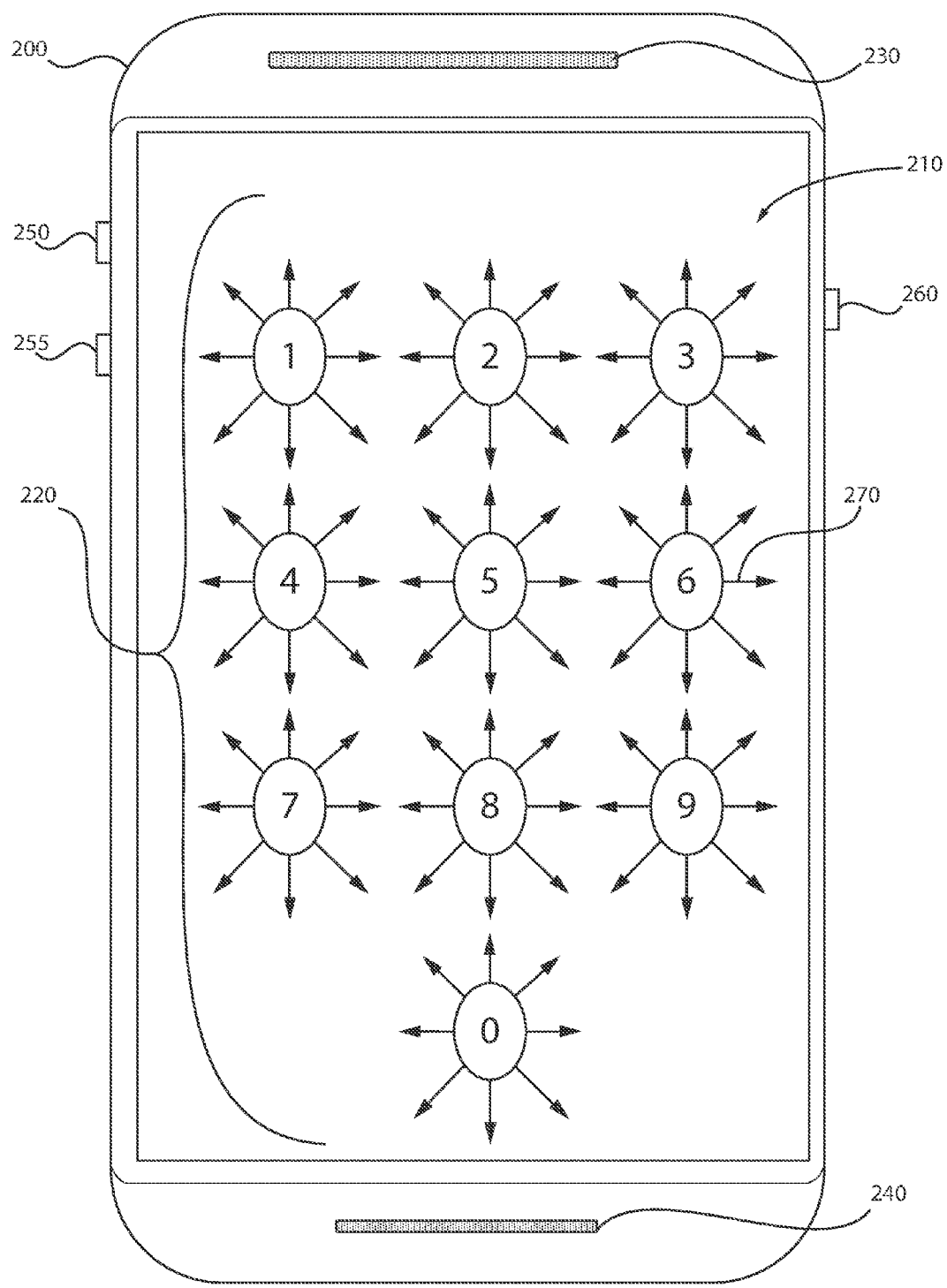
FIG. 2 is a plan view of an embodiment in accordance with the present principles, showing a touch-sensitive numeric keyboard device on a phone which demonstrates the possible directional movements away from the keys in association with key activations.

Referring to FIG. 2, depicted is a cellphone 200 having a display 210 that is displaying a keyboard device 220 in accordance with an embodiment of the present principles. The keyboard device 220 as shown is a touch-sensitive keypad (e.g., touchscreen or touchpad). Cellphone 200 is provided with other features, such as earpiece 230 for listening to phone calls, mouthpiece 240 for speaking into the phone during phone calls, and buttons 250, 255, 260 for controlling other functions, such as display activation (e.g., illumination), power on/off, restart, and volume controls. The cell phone may have other features not shown, such as an earphone jack, a speaker, and a socket for receiving a plug and cord used in charging the device.

The touchpad 220 is a numeric keypad. This depiction is merely exemplary, as the touchpad may display letters, numbers, and/or symbols. There are ten (10) keys on the touchpad 220, numbered 0 to 9. In accordance with the embodiments of the present principles, the cellphone 200 detects directional touch movements, e.g., swipes that can be made in any number of directions around each key, as shown by the arrows 270 that extend around the keys various directions. The directional touch movements as shown extend away from the keys and in various directions around the keys. In the exemplary embodiment, there are eight directions per key in which to swipe, e.g., make a touch movement. The cellphone 200 is provided with sensors that may be under the display 210 and touchpad 220 to detect touches on the keys and directional touch movements on the touchpad.

By combining touch movements in a selected direction with the activation of a sequence of keys, a more secure password for unlocking a restricted access device may be obtained. For a password sequence of five (5) numbers 3-9-0-6-5, activating one or more of these numbers with a directional touch movement increases the number of possibilities of device-unlocking password combinations. For example, entering 3-9-0 and then swiping from 0 to the upper right and then entering 6-5 as a device-unlocking combination increases the number of password combinations and provides an additional security feature. The password cannot be easily guessed or hacked since device cannot be accessed if the password entry is not simultaneously accompanied by the appropriate directional touch movement(s) during the device-unlocking process. In another combination, each key is accompanied by a directional touch movement, such as a swipe.

When a device such as a phone is configured, an individual is instructed to create a password that allows access beyond a restricted access gateway to protected device functions, such as non-emergency phone usage, email, text messaging, Internet, contact lists, calendar applications, timer applications, health-related applications, diet-related applications, exercise-related applications, financial-related applications, pay-with-device applications, shopping applications, word processing applications music libraries, television applications, video applications, games, to name a few. In configuring other kinds of restricted access gateways, such as access to an email accounts, shopping accounts, or a financial services website (banking, investments, credit cards, income tax preparation, etc.), the user is also instructed to create a password. In accordance with the present principles, a user would be instructed to create an access key sequence including a sequence of key entries and key touch movements that, upon entry at an appropriate time, e.g., when access beyond the gateway is restricted, will allow access beyond the restricted access gateway. The access key sequence may be stored in memory of the device. In other instances, it may be stored in memory on a remote server where account information is stored. Merely by way of example, such accounts may be an email account, a personal banking account, and a music library.

Figure 3:
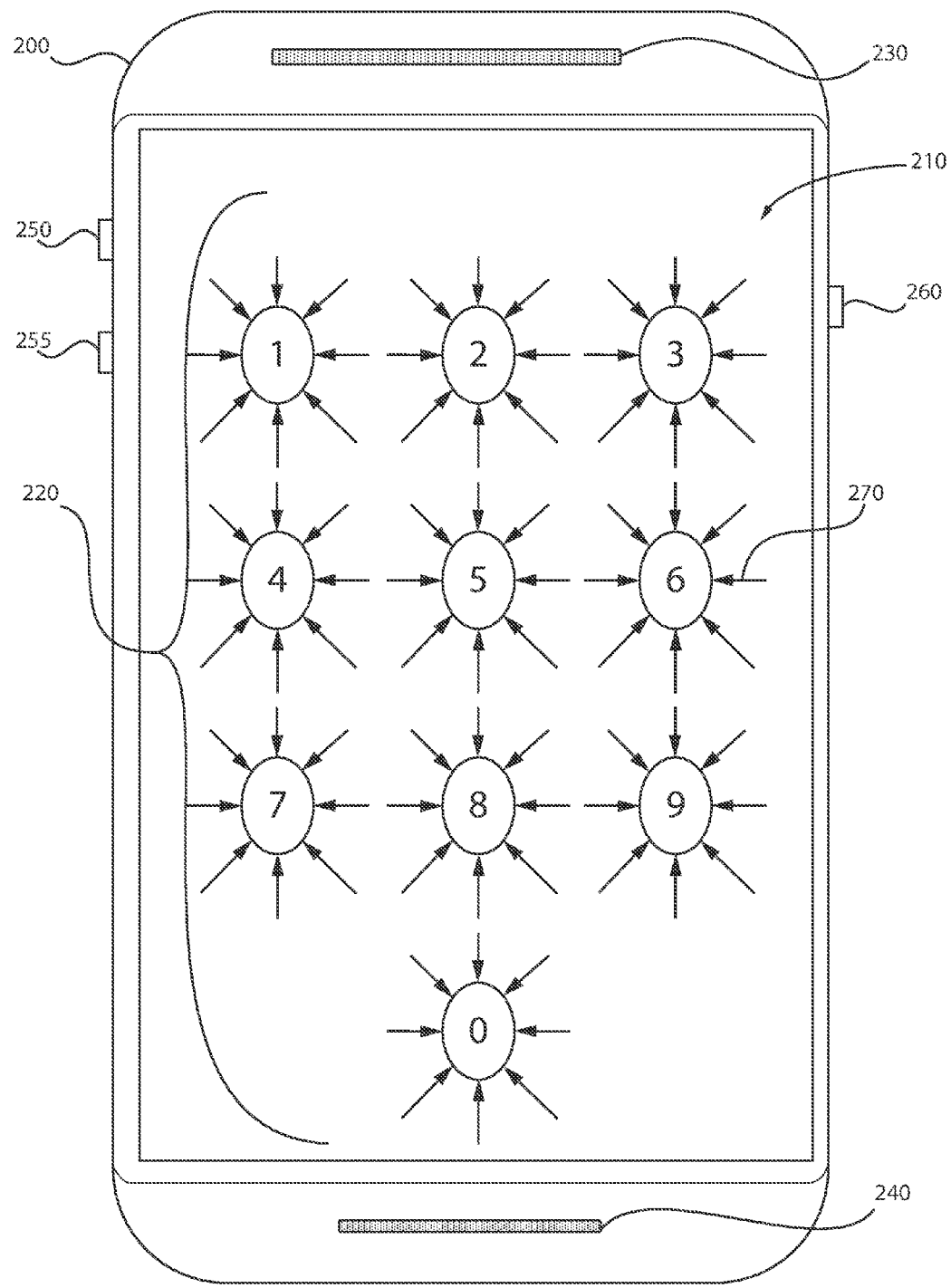
FIG. 3 is a plan view of an another embodiment in accordance with the present principles, showing a touch-sensitive numeric keyboard device on a phone which demonstrates the possible directional movements toward the keys in association with key activations.

FIG. 3 shows an alternative embodiment to that shown in FIG. 2, in which cellphone 200 is displaying keys 0 to 9 on touchpad 220, and the exemplary directional touch movements extend towards the keys in various directions around the keys, as demonstrated by arrows 270. As exemplified in FIG. 3, there are eight (8) directions per key in which to swipe, e.g., make a touch movement. By way of example, for a password sequence of 3-9-0-6-5, activating one or more of these numbers with a directional touch movement in an access key sequence increases the number of possibilities of device-unlocking combinations. For example, entering 3-9-0 and then swiping to 0 from the upper right, ending on 0, and then entering 6-5 as an access key sequence that provides access beyond a restricted access gateway increases the number of possible combinations and provides an additional security feature. It should be understood that the user may have an access key sequence that combines directional touch movements towards and away from the keys. For example, an access key sequence may be swiping 3 in an upward away movement, entering 9 and 0, and then swiping from 0 to the left, and then entering 6 and 5. In another access key sequence, each key in the combination is accompanied by a directional touch movement, such as a swipe from a key or towards a key, e.g., swipe from 3 away and upward, swipe to 9 from the upper left, swipe from 0 away and to the left, swipe to 6 from the upper right, and swipe from 5 to the right and away.

The embodiments in accordance with the present principles include a user input device sensitive to touch and to directional movement during touch, or for example, an alphanumeric input device such as a keyboard, and the creation of an access key sequence that simultaneously combines the entry of alphanumeric input and directional movement on the keyboard. A non-exhaustive list of device examples includes any of: a phone, a computer, an e-book, a tablet computer, a camera, a smart wallet, a smart card, and a watch. As indicated, the embodiments also embrace gateways that restrict access to something other than a device per se, such as a gateway restricting access through a website to an individual's bank account information. The alphanumeric device includes any of an actual keyboard and a virtual keyboard. As an example of an actual keyboard there is a keyboard provided with actual keys that are depressed to actuate a key, e.g., make a key entry. As an example of a virtual keyboard there are the touchscreen and/or touchpad arrangements that display alphanumeric characters activated when they are touched by the user, such as the screen that is provided on the cell phone or computer tablet device.

Figure 4:
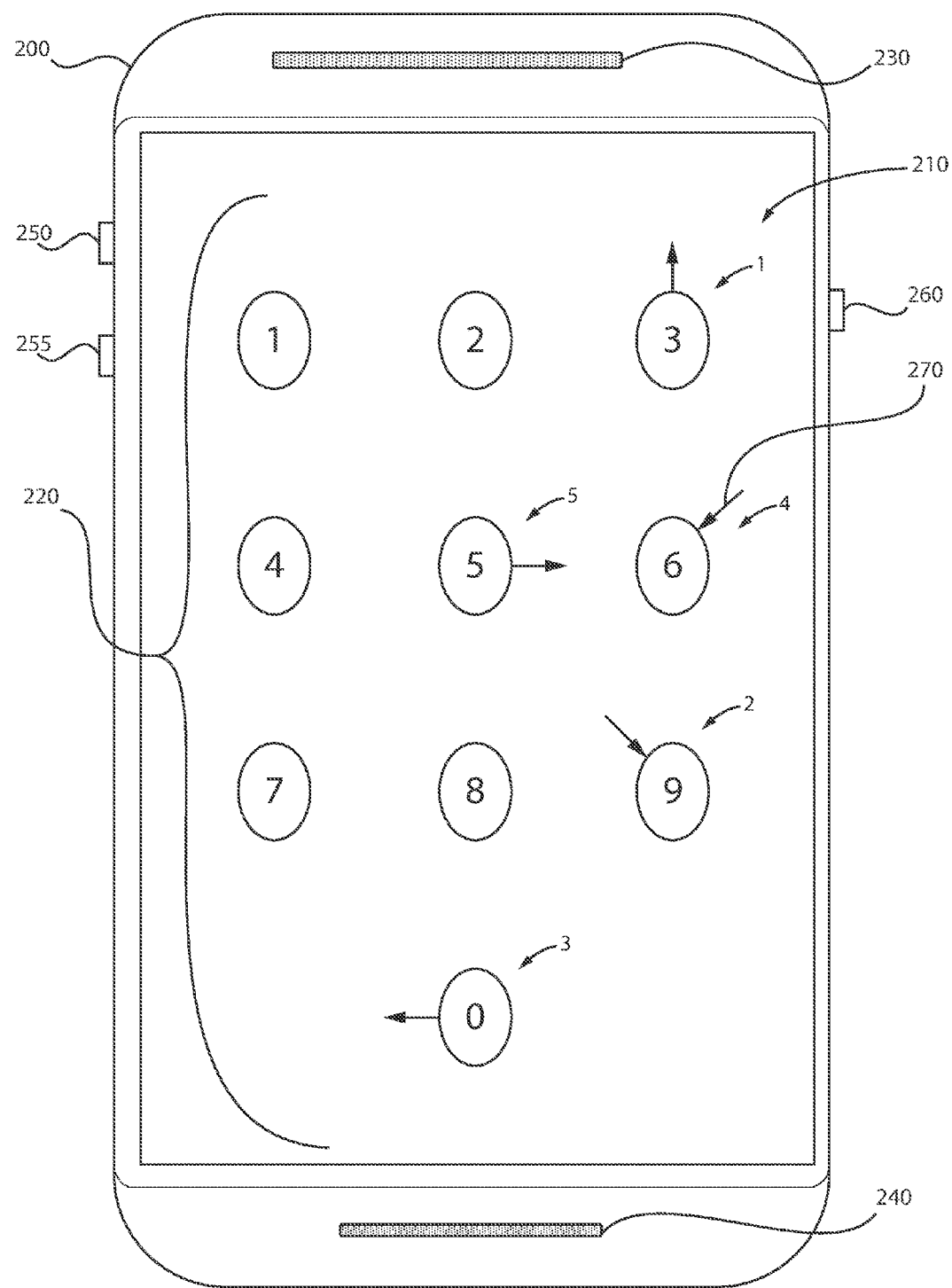
FIG. 4 is a plan view of an embodiment in accordance with the present principles, showing a touch-sensitive numeric keyboard device on a phone which demonstrates an exemplary arrangement in which a sequence of keys are touch-activated and touch movements are made on the keyboard device in a device-unlocking sequence.

FIG. 4 shows cellphone 200 displaying keys 0 to 9 on touchpad 220 and arrows 270 depicting an access key sequence including a sequence key entries and key touch movements. In this exemplary arrangement, in which a sequence of keys are touch-activated and touch movements are made on the keyboard device in a manner that matches a stored access key sequence to provide access beyond the gateway. The keypad is a numeric keypad that includes the numbers 0 to 9. The key-activation sequence, e.g., the sequence of keys activated by touching the keyboard device, is a five (5) number sequence 3-9-0-6-5, as indicated by the 1-5 sequence pointing to these keys. In the sequence, each touch activation of a key is associated with a touch movement made on the keyboard device that extends in a selected direction. In this embodiment, the touch movements are swipes. As shown, the entered combination is swiping from 3 upward and away, swiping to 9 from the upper left, swiping from 0 away to the left, swiping to 6 from the upper right, and swiping 5 away and to the right. In one embodiment, all keys are touched at the beginnings of the swipes, which essentially occur simultaneously, e.g., the key entries and key touch movements are combined actions. Since this access key sequence is stored on device memory, touch activating keys and touch movements in this sequence will provide access beyond the restricted access gateway of the cellphone 200 and will provide the user with access to the functions of the device.

In one embodiment in accordance with the present principles, the touch movements in the selected directions are relatively short movements that end in a location between the keys. For example, the making of the touch movements occur in a selected movement direction that extends away from a key that is short of extending to another key, e.g., no other key is touched in the movement, or which starts between keys and is toward a key that is touched, and no other keys are touched in this movement. For example, no other key is touched except the key associated with the touch movement.

Figure 5:
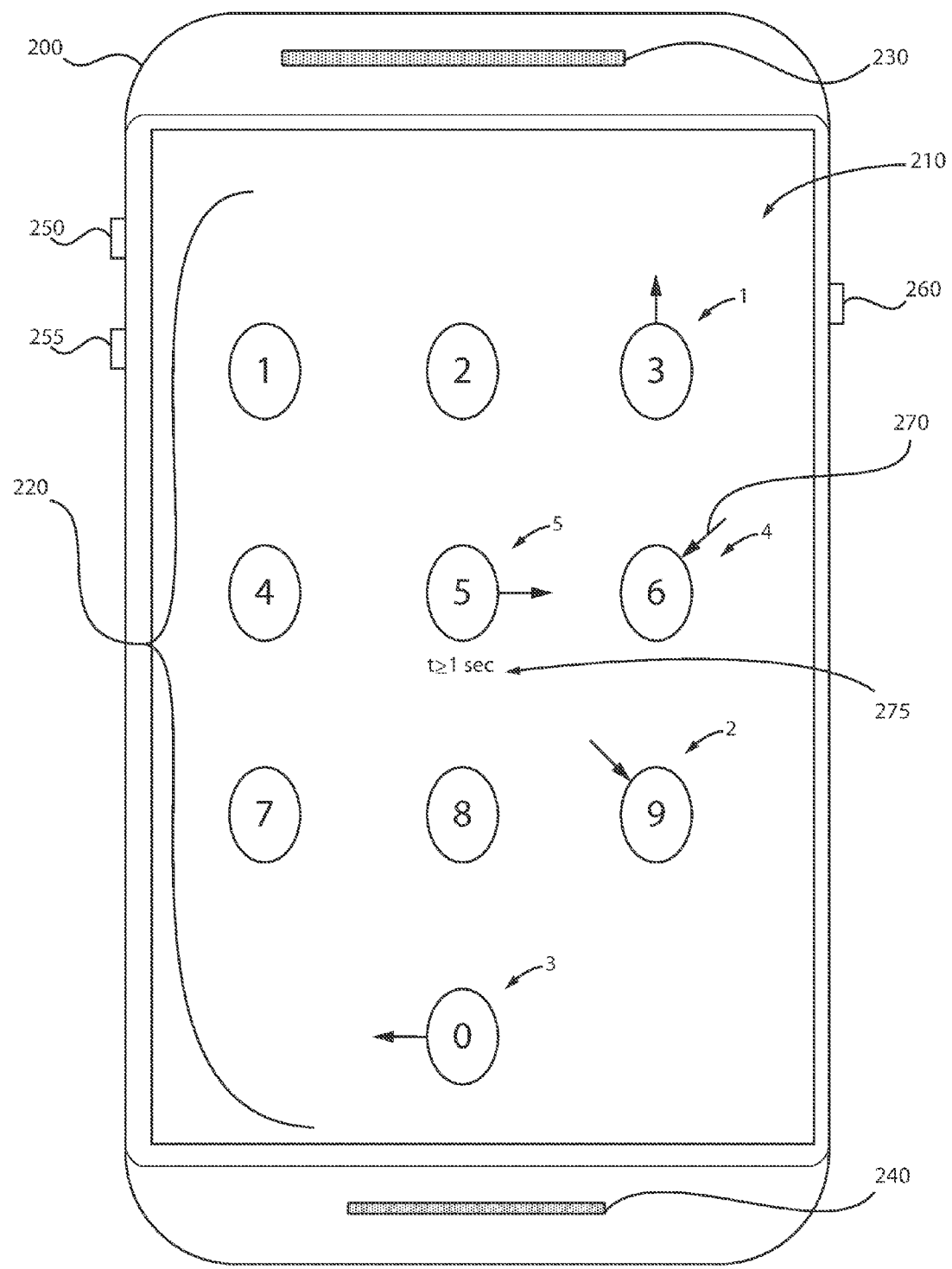
FIG. 5 is a plan view of another embodiment in accordance with the present principles, showing a touch-sensitive numeric keyboard device on a phone which demonstrates an exemplary arrangement in which a sequence of keys are touch-activated, touch movements are made on the keyboard device, and a key is touched for a sustained duration in a device-unlocking sequence.

FIG. 5 shows cellphone 200 displaying keys 0 to 9 on touchpad 220 and arrows 270 depicting an access key sequence including a sequence of key entries, key touch movements, and a tactile action. In this arrangement, a sequence of keys are touch-activated, touch movements are made on the keyboard device, and a key is touched for a sustained duration in a manner that matches a stored access key sequence to gain access beyond the gateway. The user makes the same key activations and directional movements as described above in relation to FIG. 4, and when touch-activating the number 5, performs a tactile action 275 that is sustaining the touch on the touchpad 220 for a duration of one or more seconds before swiping rightward away. In this arrangement, the sustained touching may provide an additional measure of security that prevents unauthorized users from gaining access beyond the gateway of the device. As shown, the sustained touching of a key is for a duration longer that what is needed to activate the key. Merely by way of example, the sustained touching of a key may have a duration of, for example, a quarter second, a half second, three quarters of a second, a second, or longer than a second.

As depicted in FIG. 5, one key is touched for a sustained time period as part of the correct access key sequence. It should be understood that more than one key may be touched for a sustained period of time as part of the access key sequence.

Figure 6:
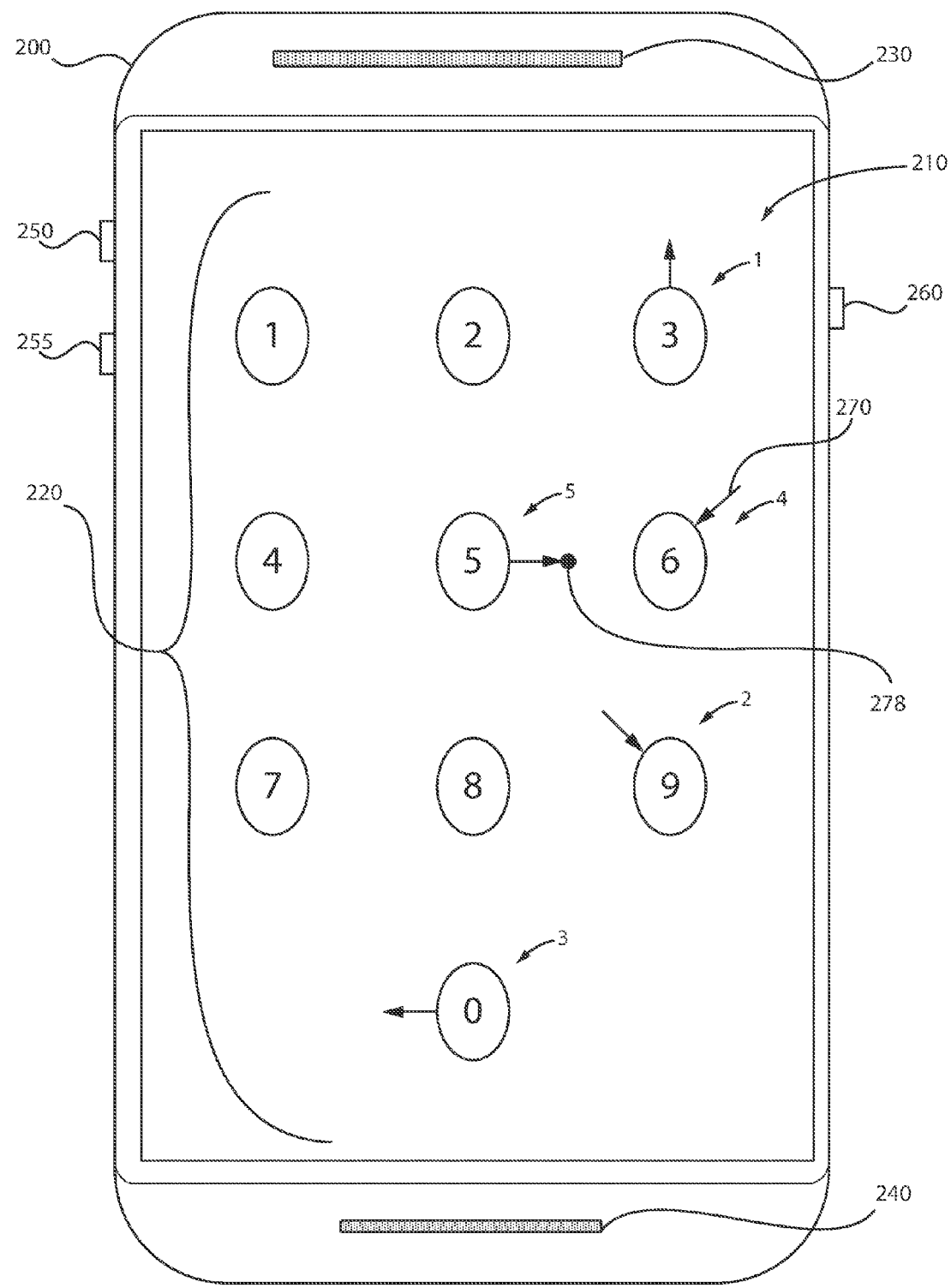
FIG. 6 is a plan view of another embodiment in accordance with the present principles, showing a touch-sensitive numeric keyboard device on a phone which demonstrates an exemplary arrangement in which a sequence of keys are touch-activated, touch movements are made on the keyboard device, and after a touch movement, a tap is made on a location of the keyboard device in a device-unlocking sequence.

FIG. 6 shows cellphone 200 displaying keys 0 to 9 on touchpad 220 and arrows 270 depicting an access key sequence including a sequence of key entries, key touch movements, and a tactile action. In this arrangement, a sequence of keys are touch-activated, touch movements are made on the keyboard device and a tap is made on a location of the keyboard device in a manner that matches a stored access key sequence to provide access beyond the gateway. As shown in FIG. 6, the user makes the same key activations and directional movements as described above in relation to FIG. 4, and when swiping the number 5 rightward away, performs a tactile action 278 that is a tap on the touchpad 220 in the area between numbers 5 and 6. In this arrangement, the tap after directional movement may provide an additional measure of security that prevents unauthorized users from gaining access beyond the gateway of the device.

As depicted in FIG. 6, the tapping is associated with one particular key as part of the device unlocking sequence (after the key is touched and swiped). It should be understood that the tapping may be associated with more than one key as part of the access key sequence.

Figure 7:
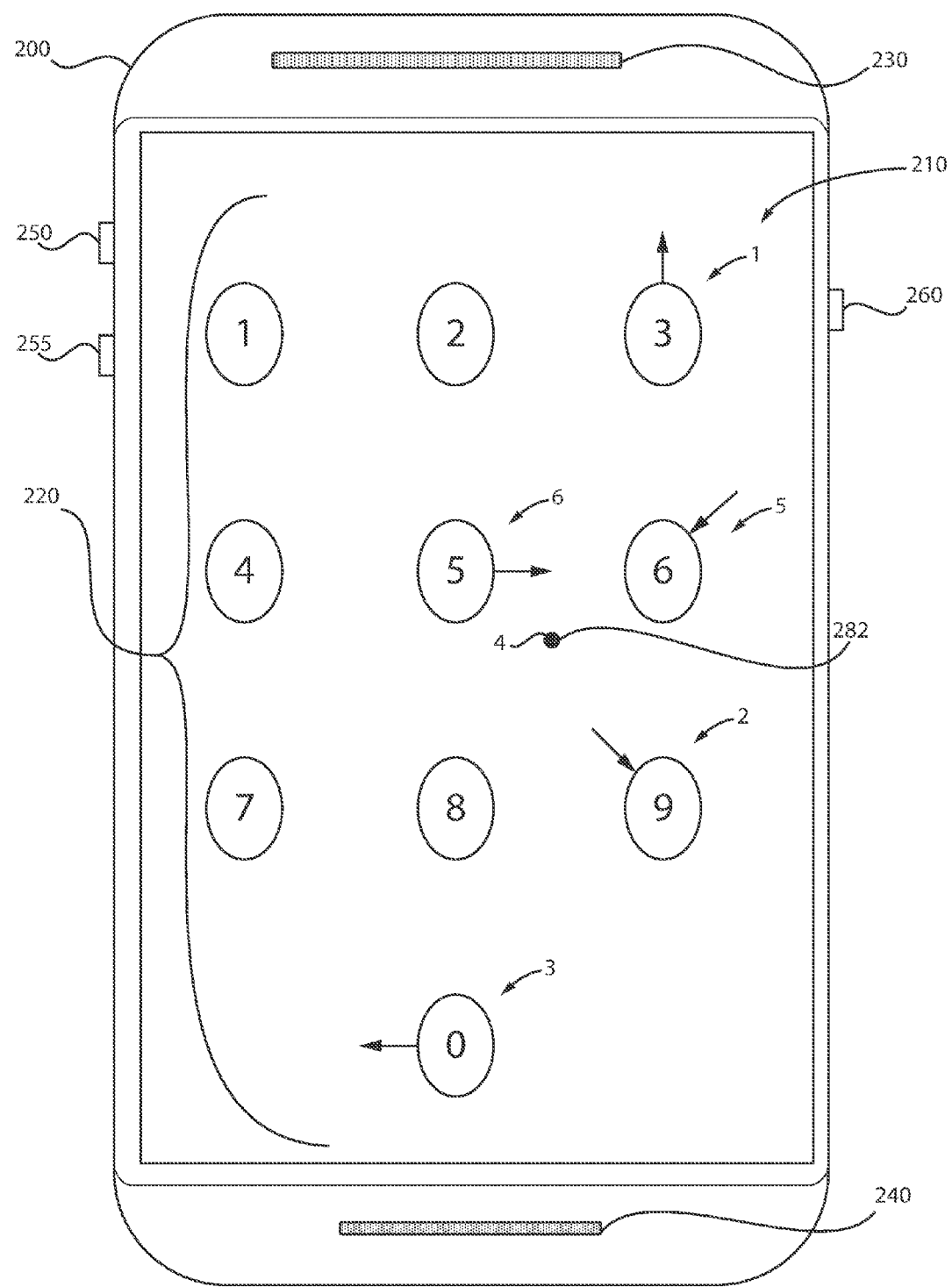
FIG. 7 is a plan view of another embodiment in accordance with the present principles, showing a touch-sensitive numeric keyboard device on a phone which demonstrates an exemplary arrangement in which a sequence of keys are touch-activated, touch movements are made on the keyboard device, and during the sequence of touch activation and movements, a tap is made on a location of the keyboard device in a device-unlocking sequence.

FIG. 7 shows cellphone 200 displaying keys 0 to 9 on touchpad 220 and arrows 270 depicting an access key sequence including a sequence of key entries, key touch movements, and a tactile action. In this arrangement, a sequence of keys are touch-activated, touch movements are made on the keyboard device, and during the sequence of touch activation and movements, a tactile action 282 that is a tap is performed on a location of the touchpad 220 in a manner that matches a stored access key sequence to provide access beyond the gateway. According to FIG. 7, the key activations and directional movements as described above in relation to FIG. 4 are made, yet here, after swiping 0 leftward away, the user taps the area of the keyboard device between the numbers 5 and 6 and 8 and 9 before swiping keys 6 and 5. In this arrangement, the additional tap, not associated with a key activation and/or a directional movement, may provide an additional measure of security that prevents unauthorized users from gaining access through the gateway.

As depicted in FIG. 7, the tapping that is part of the device unlocking sequence is not associated with any particular key, yet constitutes a tactile action that is part of the unlocking sequence. It should be understood that more than one tap may be included as part of the access key sequence.

Figure 8:
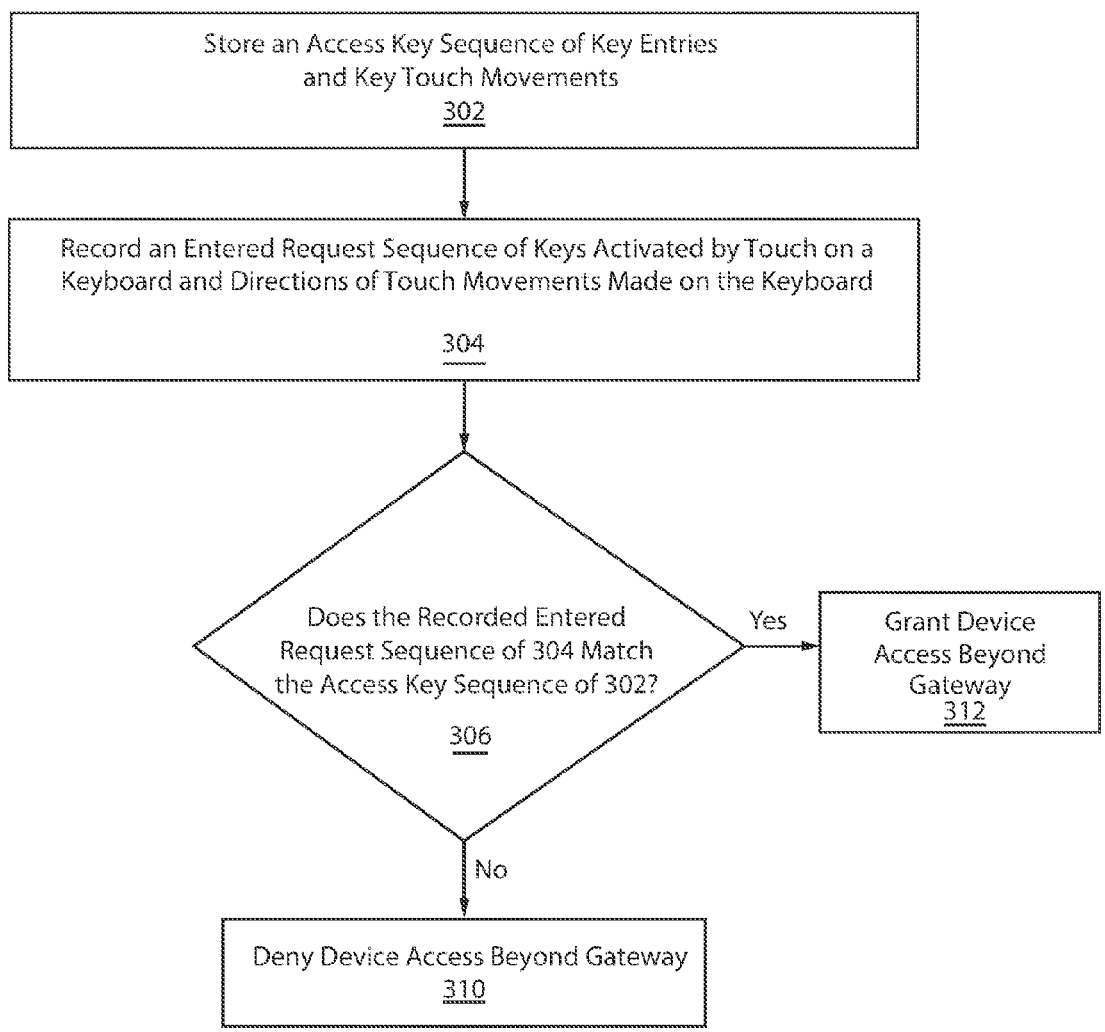
FIG. 8 depicts a block/flow diagram in accordance with an embodiment of the present principles for obtaining access to a restricted access device.

FIG. 8 depicts a block/flow diagram that describes a method 300 in accordance with an embodiment of the present principles for obtaining access to a restricted access device by making touch movements on the keyboard device.

In block 302, an access key sequence of key entries and key touch movements is stored, e.g., in the memory of a device. Storage may take place at the time of device configuration.

In block 304, an entered request sequence of keys activated by touch on a keyboard and directions of touch movements made on the keyboard are recorded. The touch movements may extend from a key or they may extend toward a key. The request sequence of keys may be entered at a time when the restricted access gateway of a device is operating, e.g., after a selected period of device inactivity, the restricted access gateway of the device activates.

In block 306, the recorded entered request sequence of 304 is compared to the access key sequence of block 302 to determine if they match. If they do not match, then proceed to block 310, where access beyond the restricted access gateway is denied. For example, if an improper key of the keyboard is activated as part of the entered request sequence that is recorded, then access beyond the gateway is denied. If there is a match between the recorded entered request sequence and the access key sequence, then proceed to block 312, where access beyond the restricted access gateway is granted.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of gaining access beyond restricted access gateways (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for gaining access beyond a restricted access gateway, comprising:
  storing an access key sequence on memory of a device, wherein the access key sequence comprises a sequence of key entries and key touch movements;
  recording an entered request sequence including keys activated by touch on a keyboard of the device and directions of touch movements made on the keyboard;
  determining with an access controller whether the entered request sequence matches the access key sequence; and
  granting access beyond the restricted access gateway to functions when the entered request sequence matches the access key sequence, wherein the restricted access gateway provides access to functions selected from the group consisting of non-emergency phone usage, email, text messaging, Internet, contact lists calendar applications, timer applications, health-related applications, diet-related applications exercise-related applications, financial-related applications, pay-with-device applications, shopping applications, word processing applications music libraries, television applications, video applications, games, and combinations thereof.

2. The method of claim 1, wherein at least one key entry and key touch movement of the access key sequence include a swipe.

3. The method of claim 2, wherein the at least one key activated by touch and direction of touch movement of the entered request sequence include a swipe.

4. The method of claim 1, wherein the access controller comprises at least one hardware processor for determining if the entered request sequence matches the access key sequence.

5. The method of claim 1, wherein the restricted access gateway provides access to functions of a device selected from the group consisting of a cell phone, a computer tablet, a desktop computer, and a personal desktop assistant.

6. The method of claim 1, wherein the keyboard of the device is a touch pad comprising touch-detecting sensors.

7. The method of claim 1, wherein the access key sequence further comprises a tactile action taken on the keyboard.

8. The method of claim 7, wherein the entered request sequence further comprises a tactile action taken on the keyboard.

9. The method of claim 8, wherein the tactile action comprises a tap on a selected location of the touch pad.

10. The method of claim 8, wherein the tactile actions comprise a sustained hold of a key.

11. A system for gaining access beyond a restricted access gateway to functions of a device having a keyboard, comprising:
   an access key module having a key entry sequence and key touch movement sequence;
   a keyboard processing module that records a sequence of touch-activated keys on the keyboard of the device;
   a touch direction detector that senses directions of touch movements on the keys during touch-activation; and
   an access controller that compares the recorded sequence of touch-activated keys and the directions of touch movements on the keys during touch-activation with the key entry sequence and key touch movement sequence of the access key module, wherein access beyond the gateway to functions of the device is granted when the recorded sequence of touch-activated keys and the directions of touch movements on the keys during touch-activation match the key entry sequence and the key touch movement sequence of the access key module, the functions of the device accessible beyond the restricted access gateway selected from the group consisting of non-emergency phone usage, email, text messaging, Internet, contact lists, calendar applications, timer applications, health-related applications, diet-related applications, exercise-related applications, financial-related applications, pay-with-device applications, shopping applications, word processing applications music libraries, television applications, video applications, games, and combinations thereof.

12. The system of claim 11, wherein the device further comprises a display that displays a touch-sensitive keyboard.

13. The system of claim 11, further comprising a touch movement analyzer that correlates the recorded sequence of touch-activated keys and the directions of touch movements on the keys during touch-activation.

14. The system of claim 11, wherein the touch direction detector is configured to sense a swipe on a touch-activated key and a touch movement made on the key.

15. The system of claim 11, wherein the touch direction detector is configured to sense a tactile action on the keyboard that comprises a tap on a location of the keyboard.

16. The system of claim 11, wherein the touch direction detector is configured to sense a tactile action on the keyboard that includes a hold of a touch-activated key for a sustained period of time.

17. A computer program product for gaining access beyond a restricted access gateway to functions of a device, the computer program product comprising a non-transitory computer readable storage medium having program instructions embodied therewith, the program instructions being executable by a computer to cause the computer to perform a method comprising:
   storing an access key sequence on memory of a device, wherein the access key sequence comprises a sequence of key entries and key touch movements;
   recording an entered request sequence comprising keys activated by touch on a keyboard of the device and directions of touch movements made on the keyboard;
   determining an access controller whether the recorded entered request sequence matches the access key sequence; and
   granting access beyond the restricted access gateway to functions when the recorded entered request sequence matches the access key sequence, wherein the restricted access gateway provides access to functions selected from the group consisting of non-emergency phone usage, email, text messaging, Internet, contact lists, calendar applications, timer applications, health-related applications, diet-related applications, exercise-related applications, financial-related applications, pay-with-device applications, shopping applications, word processing applications music libraries, television applications, video applications, games, and combinations thereof.

18. The computer program product of claim 17, wherein at least one of the sequence of key entries and the key touch movements of the access key sequence comprise a swipe.

* * * * *